United States Patent [19]

Lang

[11] 4,060,478
[45] Nov. 29, 1977

[54] COAL LIQUEFACTION BOTTOMS CONVERSION BY COKING AND GASIFICATION

[75] Inventor: Robert J. Lang, Baytown, Tex.

[73] Assignee: Exxon Research and Engineering Company, Linden, N.J.

[21] Appl. No.: 728,335

[22] Filed: Sept. 30, 1976

[51] Int. Cl.$^2$ .................... C10G 1/04; C01B 1/18
[52] U.S. Cl. .................... 208/8; 48/197 R; 201/20; 208/106
[58] Field of Search .................... 208/8; 48/197 R; 201/17, 20, 21

[56] References Cited

U.S. PATENT DOCUMENTS

| | | | |
|---|---|---|---|
| 3,617,513 | 11/1971 | Wilson et al. | 208/8 |
| 3,689,240 | 9/1972 | Aldridge et al. | 48/202 |
| 3,726,784 | 4/1973 | Correa et al. | 208/8 |
| 3,740,193 | 6/1973 | Aldridge et al. | 48/202 |
| 3,803,023 | 4/1974 | Hamner | 48/197 R |
| 3,948,759 | 4/1976 | King et al. | 48/197 R |
| 3,957,620 | 5/1976 | Fukui et al. | 201/17 |

*Primary Examiner*—Delbert E. Gantz
*Assistant Examiner*—James W. Hellwege
*Attorney, Agent, or Firm*—J. E. Reed

[57] ABSTRACT

Heavy bottoms produced by the liquefaction of coal or similar carbonaceous solids are converted into more valuable products by adding an alkaline earth metal compound to the bottoms in a concentration sufficient to give, following pyrolysis of the bottoms, an alkaline earth metal-to-carbon atomic ratio of from about 0.005:1 to about 0.1:1; pyrolyzing the bottoms at a temperature of from about 900° to about 1600° F. to produce gases, hydrocarbon liquids and coke or char containing added alkaline earth metal constituents; and thereafter gasifying the char with steam.

19 Claims, 4 Drawing Figures

COAL LIQUEFACTION BOTTOMS CONVERSION BY COKING AND GASIFICATION

BACKGROUND OF THE INVENTION

1. Field of the Invention:

This invention relates to the processing of coal and similar materials and is particularly concerned with an improved process for the upgrading of heavy bottoms produced by the liquefaction of coal an related carbonaceous solids.

2. Description of the Prior Art:

Processes for the liquefaction of coal and similar carbonaceous solids normally involve contacting the feed material with a hydrocarbon solvent and molecular hydrogen at elevated temperature and pressure. This results in partial breakdown of the complex high molecular weight starting material into lower molecular weight hydrocarbon liquids and gases. These are recovered from the liquefaction effluent, leaving a heavy liquefaction bottoms product which normally boils in excess of about 1000° F. and generally contains suspended solid residues. The liquefaction bottoms may constitute fifty percent or more by weight of the total liquefaction products.

A variety of different systems for upgrading liquefaction bottoms have been proposed in the past. Among the most attractive of these is pyrolysis of the bottoms to produce gases, additional hydrocarbon liquids, and coke, followed by steam gasification of the coke to form hydrogen and carbon monoxide for use as a fuel. Studies have shown that such an integrated process has many potential advantages over other processing systems, particularly if a catalyst is added to the coke to accelerate the gasification rate. The catalysts proposed for this purpose have normally been alkali metal compounds, particularly potassium carbonate. It has been suggested that alkaline earth metal compounds might be used to catalyze the gasification of carbonaceous solids but studies have repeatedly shown that such compounds are relatively ineffective. The impregnation of coke or char produced from liquefaction bottoms with calcium hydroxide or a similar alkaline earth metal compound normally produces only a small increase in the gasification rate compared to that obtained when potassium carbonate or a similar compound is used as a catalyst and hence use of the potassium compounds is normally more economical, despite their considerably higher cost.

SUMMARY OF THE INVENTION

The present invention provides an improved process for the production of liquid and gaseous hydrocarbons from coal and related materials which at least in part obviates the difficulties pointed out above. This improved process involves the addition of calcium hydroxide, calcium acetate, barium hydroxide or a similar alkaline earth metal compound to heavy bottoms produced by the liquefaction of bituminous coal, subbituminous coal, lignite or similar carbonaceous solids, pyrolysis of the bottoms product to produce gases, liquids and coke containing the added alkaline earth metal compound, and subsequent gasification of the coke thus produced. The invention is based in part on the discovery that calcium and other alkaline earth metal compounds, although relatively ineffective when used conventionally as catalysts for the gasification of coal, petroleum coke and the like, are highly effective when employed to catalyze the gasification of coke produced from heavy liquefaction bottoms as described above. Studies have shown that such compounds can be employed in this manner to achieve significantly higher gasification rates than can be obtained by using potassium carbonate and similar alkali metal compounds in the same concentrations and that these higher rates, coupled with the lower cost of the calcium compounds, provide significant economic incentives for use of the alkaline earth metal catalysts.

The process of the invention is preferably employed in an integrated operation where coal or similar feed material is first liquefied at high temperature and pressure by treating it with a hydrocarbon solvent and gaseous hydrogen to produce coal liquids and heavy bottoms boiling above about 1000° F., the bottoms are pyrolyzed with calcium hydroxide or a similar alkaline earth metal compound to form gases, additional hydrocarbon liquids and coke containing added alkaline earth metal constituents, this coke is then gasified with steam to form a synthesis gas composed primarily of hydrogen and carbon monoxide, and at least part of the hydrogen generated may be recylced for use in the liquefaction stage of the operation. This sequence of operation has significant advantages over processes suggested in the past and makes possible the production of liquid hydrocarbon products from coal and related materials at lower cost than has generally been possible heretofore.

DESCRIPTION OF THE PREFERRED EMBODIMENTS

Figure 1:
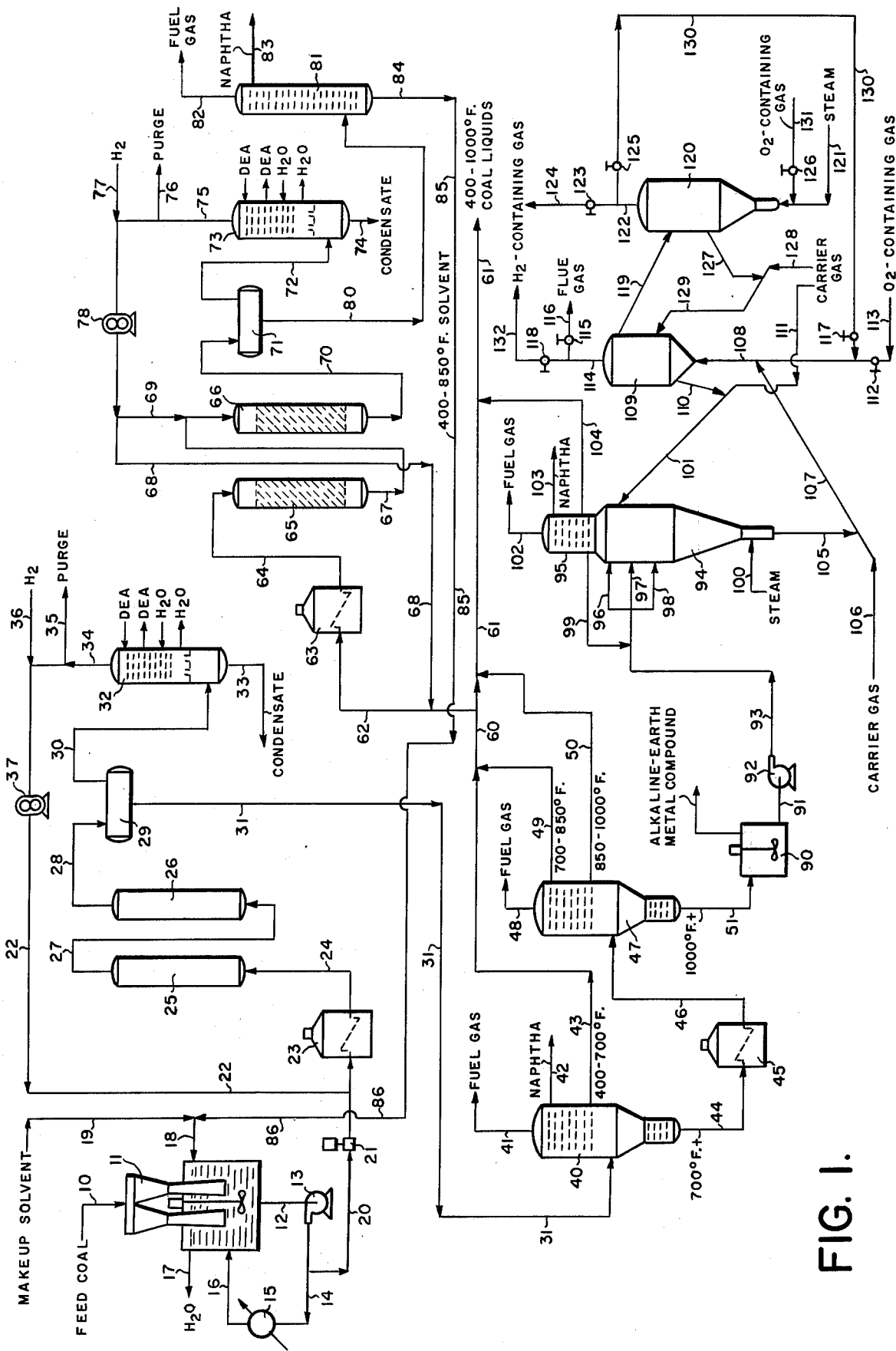
FIG. 1 in the drawing is a schematic flow diagram illustrating a preferred embodiment of the invention.

FIG. 1 in the drawing is a schematic flow diagram of a preferred embodiment of the invention in which bituminous coal, subbituminous coal, lignite or similar carbonaceous feed material is first liquefied by contacting the material with gaseous hydrogen in the presence of a hydrogen-donor solvent. Gases are separated from the liquefaction product and the remaining material is then fractionated to obtain liquids boiling up to about 1000° F. and a heavy bottoms product boiling in excess of about 1000° F. A portion of the liquids stream is hydrogenated and recycled for use as solvent and the remaining liquids are withdrawn as product coal liquids. An alkaline earth metal compound is added to the liquefaction bottoms as a catalyst and the bottoms are then pyrolyzed to produce gases, additional liquid products, and coke containing the added alkaline earth metal compound. This coke is gasified with steam to produce a hydrogen-rich gas which can be processed in the conventional manner to provide hydrogen required in the liquefaction operation. It will be understood that the process of the invention is not restricted to the particular type of liquefaction, solvent hydrogenation, pyrolysis and gasification operations illustrated in the drawing.

It may be employed with liquefaction operations, for example, carried out in ebullating beds, operations conducted in the presence of a liquefaction catalyst, operations which do not employ hydrogen-donor solvents, and operations in which gravity settling, filters, centrifuges or similar means are employed for the removal of unreacted solids and ash from the system. Similarly, the process may be used in conjunction with delayed or other coking units in lieu of the fluidized bed coking system shown and with fixed or entrained bed gasifiers in place of the fluidized bed unit depicted.

In the process shown in FIG. 1 of the drawing, feed coal is introduced into the system through line 10 from a coal storage or feed preparation zone not shown in the drawing and discharged into a slurry drying unit 11 where a slurry of the feed solids in a hydrogen-donor solvent is prepared. The feed coal employed will normally consist of solid particles of bituminous coal, subbituminous coal, lignite or a mixture of two or more such materials having a particle size on the order of about one-fourth inch or smaller along the major dimensions. It is generally preferred to employ coal which has been crushed and screened to a particle size of about 8 mesh or smaller on the U.S. Sieve Series Scale. The slurry drying unit will normally comprise an agitated drum in which the coal is suspended in hot hydrogen-donor solvent in a ratio of from about 0.8 to about 2 pounds of solvent per pound of dry coal. The temperature in the unit is maintained between about 250° and about 350° F. by recycling a portion of the slurry withdrawn through line 12 by means of slurry pump 13. The recycle stream passes through line 14 and heat exchanger 15 and is reintroduced into the slurry dryer drum through line 16. Moisture present in the feed coal is vaporized at the drum temperature and withdrawn through line 17. This vapor stream will normally include some solvent vaporized along with the water and hence it will normally be passed through heat transfer equipment not shown in the drawing to condense the solvent and permit its recovery. It is normally preferred to operate the slurry dryer so that the water content of the slurry is maintained at a level below about 2% by weight.

The hydrogen-donor solvent used in preparing the slurry is introduced into the slurry drum through line 18. This solvent will normally be a coal-derived solvent and is preferably a hydrogenated recycle solvent containing at least 20% by weight of compounds which are recognized as hydrogen donors at elevated temperatures of from about 700° to about 900° F. or higher. Solvents containing at least 50 weight percent of such compounds are preferred. Representative compounds of this type include indane, $C_{10}$–$C_{12}$ tetrahydronaphthalenes, $C_{12}$ and $C_{13}$ acenaphthenes, di-, tetra- and octahydroanthracenes, tetrahydroacenaphthenes, crysene, phenanthrene pyrene, and other derivatives of partially saturated aromatic hydrocarbons. Such solvents have been described in the literature and will be familiar to those skilled in the art. The solvent composition resulting from the hydrogenation of recycle solvent fractions will depend in part upon the particular coal used as the feedstock to the process, the process steps and operating conditions employed, and the conditions used in hydrogenating the solvent fractions selected for recycle following liquefaction. It is generally preferred that the solvent be mixed with the feed coal in a ratio of from about 1.0 to about 1.5 pounds of solvent per pound of dry coal. The solvent employed on initial startup of the process and any makeup solvent that might be required for any reason can be added to the system through line 19. During normal operations, the process produces an excess of liquid hydrocarbons in the solvent boiling range and hence the addition of makeup solvent is ordinarily not required.

The coal-solvent slurry not recycled to the slurry preparation drum is passed through line 20 and slurry pump 21 where the pressure is raised to the liquefaction pressure of from about 1000 to about 3000 psig, preferably between about 1500 and about 2500 psig. High pressure treat gas composed primarily of hydrogen but also including lesser quantities of carbon monoxide is introduced into the slurry downstream of the pump through line 22 in an amount sufficient to supply from about 1 to about 8 weight percent, preferably from about 2 to about 5 weight percent, of hydrogen on a moisture-and-ash-free coal basis. The resulting stream is then passed into mixed phase preheat furnace 23 where it is heated to a temperature within the range between about 750° F. and about 950° F. or higher. In lieu of this procedure, the treat gas can be separately preheated in a furnace not shown in the drawing and thereafter mixed with the hot slurry downstream of furnace 23.

The hot slurry containing suspended coal particles, hydrogen-donor solvent, and molecular hydrogen is passed through line 24 into the first of a series of liquefaction reactors 25 and 26. Although two upflow type reactors are shown in the drawing, reactors of other types may be employed and in some cases it may be desirable to use a single reactor or provide three or more reactors. Reactors arranged in parallel instead of in series as shown can also be used in some cases. Within the reactors, temperatures between about 750° F. and about 950° F. and pressures between about 1000 psig and about 3000 psig, preferably between about 1500 and about 2500 psig, are maintained. The liquid residence time within the two reactors, interconnected by line 27, will normally range between about 5 minutes and about 100 minutes, preferably between about 10 and about 60 minutes. Under these conditions, high molecular weight constituents of the feed coal are broken down and hydrogenated to form lower molecular weight gaseous, vapor, and liquid products. The liquid products will include heavy constituents having boiling points in excess of about 1000° F. at atmospheric pressure. The hydrogen-donor solvent contributes hydrogen atoms which react with organic radicals liberated from the coal and prevent their recombination. Hydrogen in the treat gas injected into the slurry serves as replacement hydrogen for depleted hydrogen-donor molecules in the solvent and results in the formation of additional hydrogen-donor molecules by in situ hydrogenation. Some direct hydrogenation of coal radicals by hydrogen in the treat gas may also take place. The process conditions within the liquefaction zone are selected to insure the generation of sufficient hydrogen donor precursors and at the same time provide sufficient liquid product for proper operation of the solvent hydrogenation zone to be described hereafter. These conditions may be varied as necessary.

The liquefaction reactor product stream is withdrawn from reactor 26 through line 28. This stream will normally include gaseous products such as carbon monoxide, carbon dioxide, ammonia, hydrogen, hydrogen chloride, hydrogen sulfide, methane, ethane, ethylene, propane, propylene and the like. It will also include solvent, coal liquids ranging from naphtha boiling range materials through heavy liquefaction products boiling in excess of about 1000° F., and entrained solids including unreacted coal and ash residues. This stream is passed from line 28 into liquefaction reactor effluent separator 29 where it is separated into an overhead vapor stream withdrawn through line 30 and a liquid stream taken off through line 31. Although only a single separator is shown, two or more separators may be provided. Heat exchange equipment not shown in the drawing will normally be included to permit the condensation of liquids and the recovery of heat for the generation of steam to be used elsewhere in the system. The vapor stream withdrawn from separator 29 through line 30, after passage through heat recovery equipment not shown, is introduced into scrubbing unit 32 where the vapors are contacted with water and with an absorbent or solvent such as diethanolamine for the removal of hydrogen sulfide, carbon dioxide and other acid gas constituents in the conventional manner. Hydrocarbons condensed from the vapor are recovered as condensate through line 33 and gases are taken overhead through line 34. A portion of the gas stream will normally be purged through line 35 to prevent the buildup in the system of carbon monoxide, light hydrocarbons, and other contaminants in excessive quantities. Makeup hydrogen is introduced into the gas stream through line 36, the gases are compressed sufficiently in compressor 37 to permit their recycle, and the high pressure stream is then passed through line 22 into the slurry being fed to preheat furnace 23. It will be understood that the process is not restricted to the particular gas treating system shown and that separate scrubbers or similar equipment and solvents other than or in addition to diethanolamine can be employed if desired.

The liquids recovered from the liquefaction reactor effluent through line 31 are passed through pressure letdown valves and heat transfer equipment not shown in the drawing and then fed into atmospheric fractionator 40. Here the liquid stream is fractionated to produce an overhead stream composed primarily of hydrocarbon gases which is recovered through line 41, a naphtha stream boiling up to about 400° F. which is taken off through line 42, an intermediate liquid stream boiling between about 400° and about 700° F. which is withdrawn through line 43, and a heavier fraction boiling above about 700° F. which is withdrawn through line 44. Pumparound equipment, heat exchangers and other auxiliaries associated with the atmospheric fractionator are not shown. The overhead gases can be employed as fuel gas or used for other purposes. The naphtha stream may be withdrawn as product or alternatively combined with the intermediate boiling stream in line 43 and fed to the solvent hydrogenation unit as described hereafter. The heavier fraction recovered through line 44 is passed through vacuum fractionator preheat furnace 45 and then passed through line 46 into vacuum fractionator 47.

In the vacuum fractionator, the liquids are further distilled under reduced pressure to produce an overhead fuel gas stream which is taken off through line 48, an intermediate stream boiling between about 700 and about 850° F. which is passed through line 49 and combined with the 400° to 700° F. fraction from the atmospheric fractionator in line 43, a somewhat heavier fraction boiling between about 850° and about 1000° F. which is withdrawn through line 50, and a heavy bottoms fraction composed primarily of constituents boiling in excess of about 1000° F. which is recovered through line 51. This heavy fraction is referred to as the liquefaction bottoms and in the process shown will generally include suspended particles of unreacted coal and ash residues. In other processes employing gravity separation, centrifuges or the like for the removal of such solids, these suspended particles may be present in somewhat lower concentrations. The liquefaction bottoms may constitute as much as 50% of the total effluent from the liquefaction stage of the process.

The nominal 400° to 700° F. fraction withdrawn from the atmospheric fractionator through line 43 and the 700° to 850° F. fraction from the vacuum fractionator in line 49 are combined in line 60. A portion of this liquid stream is combined with the nominal 850° to 1000° F. sidestream from the vacuum fractionator in line 50 and passed through line 61 for withdrawal from the system as 400° to 1000° F. coal liquids. The remaining 400° to 850° F. steam in line 60 is passed through line 62 to solvent hydrogenation preheat furnace 63. Here the liquids are heated to the solvent hydrogenation temperature and then passed through line 64 to the first of a series of solvent hydrogenation reactors 65 and 66. These two reactors are interconnected by line 67 which may include one or more heat transfer units not shown in the drawing. The solvent hydrogenation reaction is an exothermic reaction and hence cooling or quenching is normally required to avoid excessive reaction temperatures, particularly in the second stage. Either liquid or gas quenching may be employed. Although two downflow fixed bed hydrogenation reactors are shown in the drawing, it will be understood that the process is not restricted to this particular hydrogenation reactor configuration and that in some cases a single stage unit or more than two stages may be advantages.

The solvent hydrogenation unit will normally be operated at a pressure and temperature somewhat below those in the liquefaction unit. The temperature, pressure and space velocity employed for solvent hydrogenation will depend to some extent upon the character of the feed stream to the unit, the catalyst employed, and other factors. In general, however, temperatures within the range between about 550° F. and about 850° F., pressures between about 800 psig and about 3000 psig, and space velocities within the range between about 0.3 and about 3 pounds of feed/hour/-pound of catalyst are preferred. Hydrogen treat rates sufficient to give hydrogen partial pressures in the reactor within the range between about 500 and about 2000 psig will ordinarily be employed. The hydrogen employed is introduced into the first stage by passing it through line 68 into the feed stream in line 62 upstream of the preheat furnace 63. Additional hydrogen for the second stage of the hydrogenation unit is supplied through line 69 upstream of the second stage and serves in part to quench the reaction in the second stage. It is normally advantageous to maintain a mean hydrogenation temperature in the solvent hydrogenation zone between about 675° F. and about 750° F., a pressure between about 2000 and about 2500 psig, a liquid hourly space velocity between about 1 and 2.5 pounds of feed/-hour/pound of catalyst, and a hydrogen treat rate sufficient to give a hydrogen partial pressure within the range between about 900 and about 1600 psig.

Any of a variety or conventional hydrotreating catalysts may be employed for purposes of the invention. Such catalysts typically comprise an alumina or silica-alumina support carrying one or more iron group metals and one or more metals from Group VI-B of the Periodic Table in the form of an oxide or sulfide. Combinations of two or more group VI-B metal oxides or sulfides are generally preferred. Representative metal combinations which may be employed in such catalysts include oxides and sulfides of cobalt-molybdenum, nickel-molybdenum-tungsten, cobalt-nickel-molybdenum, nickel-molybdenum, and the like. A suitable catalyst, for example, may be a high metal content sulfides cobalt-molybdenum-alumina catalyst containing from 1 to 10 weight percent of cobalt oxide and about 5 to 40 weight percent of molybdenum oxide, preferably from 2 to 5 weight percent of the cobalt oxide and from about 10 to 30 weight percent of the molybdenum oxide. Other metal oxides and sulfides in addition to those specifically referred to above, particularly the oxides of iron, nickel, chromium, tungsten and the like, can also be used. Numerous commercial hydrogenation catalysts suitable for use in the process of the invention are available from various catalyst manufacturers and will be familiar to those skilled in the art.

The reaction taking place in the solvent hydrogenation zone serves primarily to regenerate the hydrogen-donor solvent used for liquefaction purposes. The hydrogenated effluent is withdrawn from the second stage 66 of the solvent hydrogenation zone through line 70, passed through heat exchange equipment not shown in the drawing, and introduced into liquid gas separator 71. A vapor stream withdrawn from the separator through line 72 is introduced into scrubbing unit 73 where the vapor is contacted with water and a solvent or absorbent such as diethanolamine for the removal of hydrogen sulfide, ammonia, carbon dioxide, and other acid gases. Hydrocarbons condensed in the scrubbing unit are recovered as condensate through line 74. The gases are taken overhead through line 75 and a portion of the gas stream is purged by means of line 76 to prevent the buildup of undesirable constituents within the system. The remaining gases are combined with makeup hydrogen introduced through line 77, raised to solvent hydrogenation pressure in compressor 78, and then recycled to the solvent hydrogenation zone through lines 68 and 69. Again it will be understood that the process is not restricted to the particular procedure shown for treatment of the gases and that other procedures and different solvents may be employed if desired.

The liquid portion of the solvent hydrogenation zone effluent is withdrawn from separator 71 through line 80 and, after suitable heat exchange in equipment not shown in the drawing, is introduced into solvent hydrogenation fractionator 81. Here the liquids are fractionated to produce an overhead stream taken off through line 82, a naphtha stream recovered through line 83, and a bottoms stream withdrawn through line 84. The overhead gases will be composed for the most part of hydrocarbon gases and can be employed as a fuel. The naphtha constitutes an additional product of the process. The high boiling material withdrawn through line 84 is a regenerated donor solvent stream having a nominal boiling range between about 400° and about 850° F. This stream is passed through lines 85, 86 and 18 to slurry dryer 11 where it is employed for preparation of the coal-donor solvent slurry fed to the liquefaction unit.

The heavy liquefaction bottoms withdrawn from vacuum fractionator 47 through line 51 is passed to catalyst addition zone 90. Here an alkaline earth metal compound, that is a compound of one or more of the divalent elements calcium, strontium and barium of Group II-A of the Periodic system, is added to the hot liquid hydrocarbons. Any of a variety of different oxides, hydroxides or organic or inorganic salts or soaps of calcium, barium or strontium may be used. Representative compounds which are satisfactory include calcium acetate, calcium stearate, calcium naphthenate, calcium oxide, calcium hydroxide, calcium formate, calcium oxalate, calcium carbonate, barium acetate, barium formate, barium oxide, barium silicate, barium hydroxide, strontium acetate, strontium hydroxide, strontium oxalate, and the like. Studies show that the calcium compounds are generally most effective, followed by the barium and strontium compounds in that order. Although various alkaline earth metal compounds can be employed for purposes of the invention, it is generally preferred to employ the oxides, hydroxides, or organic soaps and to avoid the halides, nitrates, sulfates, sulfides and similar compounds which will contribute sulfur, nitrogen or halogens that may ultimately need to be removed from the products obtained to prevent damage to catalysts in subsequent refining operations or for other reasons. The alkaline earth metal compounds are normally employed in finely divided form and should be thoroughly distributed within the liquefaction bottoms. If desired, the alkaline earth metal compounds can be added in a carrier such as isopropanol, methyl ethyl ketone or a similar organic solvent. The compounds are generally added to the bottoms in concentrations sufficient to provide, following pyrolysis of the bottoms, alkaline earth metal-to-carbon atomic ratios of from about 0.005:1 to about 0.1:1, preferably from about 0.01:1 to about 0.06:1. Knowing the composition of the bottom and the yield of coke or char during pyrolysis, the quantity of alkaline earth metal compound which must be added to the bottoms to give these atomic ratios can be readily calculated. In general, however, the addition of alkaline earth metal compounds to the bottoms in concentrations between about 1% and about 30% by weight, based on the bottoms, is effective. The optimum amount will depend in part, of course, on the particular compound selected.

The mixture of hot liquefaction bottoms and added alkaline earth metal compound prepared as described above is passed through line 91 and pump 92 and fed through line 93 to a fluidized bed coking unit 94. This unit will normally be provided with an upper scrubbing and fractionation section 95 from which liquid and gaseous products produced as a result of the coking reactions can be withdrawn. The unit will generally also include one or more internal cyclone separators or similar devices not shown in the drawing which serve to remove entrained particles from the upflowing gases and vapors entering the scrubbing and fractionation section and return them to the fluidized bed below. A plurality of feed lines 96, 97 and 98 will ordinarily be provided to obtain better distribution of the feed material within the coking unit. The liquefaction bottoms containing the alkaline earth metal compound may be blended with heavy recycle material withdrawn from the scrubbing section of the unit through line 99 if desired. In some cases gasifier fines produced in the process can also be added to the liquefaction bottoms and fed into the coking unit.

The fluidized bed coking unit shown in FIG. 1 contains a bed of coke particles which are maintained in the fluidized state by means of steam or other fluidizing gas introduced near the bottom of the unit through line 100. This fluidized bed is normally maintained at a temperature between about 900° F. and about 1600° F. by means of hot char which is introduced into the upper part of the reaction section of the coker through line 101. The pressure within the reaction zone will generally range between about 10 and about 30 pounds per square inch gauge but higher pressure can be employed if desired. The optimum conditions in the reaction zone will depend in part upon the characteristics of the particular feed material employed and can be readily determined.

The hot liquefaction bottoms containing the alkaline earth metal compound to be employed as a catalyst during subsequent gasification operations is fed into the reaction zone of the coking unit through lines 96, 97 and 98 and sprayed onto the surfaces of the coke particles in the fluidized bed. Here it is rapidly heated to bed temperatures. As the temperature of the bottoms increases, lower boiling constituents are vaporized and the heavier portions undergo thermal cracking and other reactions to form lighter products and additional coke on the surfaces of the bed particles. The alkaline earth metal compounds present in the feed are retained by the coke as it forms. Vaporized products, unreacted steam, and entrained solids move upwardly through the fluidized bed and enter the cyclone separators or similar devices where solids present in the fluids are rejected. The fluids then move into the scrubbing and fractionation section of the unit where refluxing takes place. An overhead gas stream is withdrawn from the coker through line 102 and may be employed as a fuel gas or the like. A naphtha side stream is withdrawn through line 103 and may be combined with naphtha produced at other stages in the process. A heavier liquids fraction having a nominal boiling range between about 400° and about 1000° F. is withdrawn as a side stream through line 104 and combined with the coal liquids in line 61 for withdrawal from the system. Heavy liquids boiling above about 1000° F. may be withdrawn through line 99 for recycle to the incoming feed as described earlier.

The coke particles in the fluidized bed of the reaction section tend to increase in size as additional coke is deposited. These particles, which contain alkaline earth metal compounds introduced with feed, thus gradually move downwardly through the fluidized bed and are eventually discharged from the reaction section through line 105 as a dense phase solids stream. This stream is picked up by steam or other carrier gas introduced through line 106 and transported upwardly through lines 107 and 108 into fluidized bed heater 109. Here the coke particles in the fluidized bed are heated to a temperature of from about 50° to about 300° F. above that in the reaction section of the coker. Hot solids are withdrawn from the bed of heater 109 through standpipe 110, picked up by steam or other carrier gas introduced through line 111, and returned to the reaction section of the coker through line 101. the circulation rate between the coker and the heater is thus maintained sufficiently high to provide the heat necessary to keep the coker at the required temperature. The solids within the heater can be either heated directly by the introduction of air or oxygen or by the passage of hot gases from the gasifier associated with the unit as described below.

If the solids in heater 109 are to be heated by the direct injection of air or oxygen-containing gas, valve 112 in line 113 will be opened and the air or oxygen-containing gas will be passed upwardly through line 108 into the bottom of the heater. Flue gases taken overhead from the heater through line 114 will be passed through valve 115 and line 116 for the removal of solids and contaminants prior to discharge of the gases into the atmosphere or their use for other purposes. In this mode of operation, valves 117 and 118 are normally closed.

Hot carbonaceous particles are continuously circulated from the fluidized bed in heater 109 through line 119 to fluidized bed gasifier 120. Here the particles are contacted with steam introduced into the lower end of the gasifier through line 121. The alkaline earth metal constituents contained in the hot carbonaceous solids catalyze the steam gasification reaction to produce a gas containing hydrogen, carbon monoxide, carbon dioxide, and some methane. This gas is taken overhead from the gasifier through line 122, passed through valve 123, and discharged through line 124 to downstream upgrading equipment where the gas can be shifted over a shift catalyst to increase the ratio of hydrogen to carbon monoxide, acid gases can be removed, and the residual carbon monoxide can be catalytically methanated to produce a high purity hydrogen stream suitable for use as makeup hydrogen for the liquefaction and solvent hydrogenation steps of the process. Conventional shift, acid gas removal, and methanation procedures can be employed. In this mode of operation, valves 125 and 126 are kept closed.

A stream of carbonaceous solids is continuously withdrawn from the gasifier through standpipe 127, entrained in steam, flue gas or other carrier gas introduced through line 128, and returned to heater 109 through line 129. The solids circulation rate between the heater and gasifier is adjusted to maintain a gasifier temperature within the range between about 1200° and about 1800° F. The alkaline earth metal catalyst permits gasification at temperatures below those which would be required in the absence of a catalyst and thus facilitates use of the heater to provide the heat required for both coking unit 94 and gasiflier 120. It is generally preferred to operate the gasifier at a temperature between about 1200° and about 1500° F. and to operate the fluidized bed heater at a temperature of from about 1500° to about 1800° F.

In lieu of introducing air or an oxygen-containing gas into the fluidized bed heater through line 113 as described above, hot gases taken overhead from the gasifier through line 122 can be passed though valve 125, line 130, valve 117 and line 108 to the heater. In this case, valves 123 and 112 will normally be closed. Air or oxygen-containing gas is introduced into the lower end of the gasifier through line 131 with the steam employed for gasification purposes. The amount of air or oxygen-containing gas thus provided is adjusted so that the required gasification temperatures in gasifier 120 is maintained. The hot gases passing from the gasifier to the fluidized bed heater transfer heat to the solid particles within the heater and maintain them at the required temperature level. The gas taken overhead from the heater in this case will include the gasification products. This gas stream, assuming that oxygen rather than air is injected into the lower end of the gasifier with the steam used for gasification purposes, will consist primarily of hydrogen, carbon monoxide, carbon dioxide, and some methane. The gases are taken overhead from the heater through line 114, valve 118 and line 132. Valve 115 is normally closed. These gases will generally be passed to downstream gas upgrading equipment for shifting of the gas, removal of acid gases, and methanation of the residual carbon monoxide by conventional procedures to produce a high purity hydrogen stream. This hydrogen can then be compressed and employed in the liquefaction and solvent hydrogenation steps of the process. If desired, additional hydrogen can be produced by the steam reforming of at least part of the fuel gas generated in the process. Following the steam reforming step, the resultant gases can be processed for the recovery of a high purity hydrogen stream in much the same manner as the gases produced in the steam gasification step of the process.

The nature and objects of the invention and the effectiveness of the alkaline earth metal compounds for catalyzing the steam gasification reaction when employed in accordance with the invention are further illustrated by the results of laboratory gasification studies using various alkaline earth metal compounds as catalysts. In a first series of tests, samples of petroleum coke were impregnated with aqueous solutions of calcium hydroxide and potassium carbonate to give calcium-to-carbon and potassium-to-carbon atomic ratios of 0.015 to 1. The coke samples thus prepared were then separately gasified at a temperature of 1400° F. and essentially atmospheric pressure in a laboratory bench scale gasification unit. Control samples containing no catalyst were also gasified for comparison purposes. The gasification rates obtained with each set of samples was determined. Results obtained are set forth in Table I below.

TABLE I

Steam Gasification of Petroleum Coke

| Sample | Catalyst | Alkaline Earth Metal-to-Carbon Atomic Ratio | Gasification Rate* %/Hr. |
|---|---|---|---|
| A | None | — | 5 |
| B | $Ca(OH)_2$ | 0.015 Ca/C | 15 |
| C | $K_2CO_3$ | 0.015 K/C | 105 |

*Based on 30–50% gasified.

It can be seen from Table I above that the potassium carbonate had a pronounced effect upon the gasification rate obtained with the petroleum coke. The rate increased from 5% per hour to 105% per hour. The calcium hydroxide, on the other hand, had only a slight effect, resulting in an increase from 5% per hour to 15% per hours. These results confirm those shown in the prior art. Although calcium and other alkaline earth metal compounds appear to catalyze the gasification of carbonaceous solids to some extent, the effect is slight and only marginal improvements in the gasification rate are mormally obtained. For this reason, earlier work of the gasification coal, coke and other carbonaceous solids has largely focused on the use of alkali metal compounds such as potassium carbonate and relatively little attention has been directed to the use of alkaline earth metal compounds.

Following the tests described above, additional steam gasification tests were carried out using liquefaction bottoms produced in a pilot plant liquefaction unit of the same general type as that shown in FIG. 1 in lieu of the petroleum coke employed in the earlier tests. In these later tests, calcium hydroxide, calcium acetate and potassium carbonate were employed as catalysts. In each case, the catalyst utilized was added to the liquefaction bottoms in a concentration sufficient to give a metal-to-carbon atomic ratio of about 0.015 to 1 following pyrolysis. The samples were prepared by adding solutions of the metal compounds to samples of solid finely divided liquefaction bottoms. These samples were then heated to pyrolysis temperatures and thereafter steam gasified at 1400° F. in the same apparatus and under the same conditions employed for the tests set forth in Table I above. The results of these later tests are shown in Table II below.

TABLE II

Steam-Gasification of Liquefaction Bottoms

| Sample | Catalyst | Metal-to-Carbon Atomic Ratio | Gasification Rate* %/Hr. |
|---|---|---|---|
| D | None | — | 10 |
| E | $Ca(OH)_2 + H_2O$ | 0.015 Ca/C | 79 |
| F | $Ca(C_2H_3O_2)_2 + H_2O$ | 0.015 Ca/C | 96 |
| G | $K_2CO_3 + H_2O$ | 0.015 K/C | 21 |
| H | $Ca(C_2H_3O_2)_2 + MEK$ | 0.015 Ca/C | 134 |

*Based on 30-50% gasified.

It can be seen from the data set forth in Table II that the results obtained with the liquefaction bottoms were quite different from those obtained with the petroleum coke used earlier. The improvement in gasification rate obtained with potassium carbonate was relatively small, an increase from 10% per hour with no catalyst to 21% per hour with potassium carbonate in a 0.015 potassium-to-carbon atomic ratio. With calcium hydroxide as a catalyst, on the other hand, the gasification rate increased from 10% per hour with no catalyst to 79% per hour with a 0.015 calcium-to-carbon atomic ratio. When calcium acetate was used, the gasification rate went up from 10% per hour to 96% per hour with a 0.015 calcium-to-carbon atomic ratio. With calcium acetate in methyl ethyl ketone, an increase to 134% per hour was obtained. In view of the results obtained with petroleum coke and the teachings of the prior art concerning the use of alkaline earth metal compounds to catalyze the gasification of carbonaceous solids, the results obtained with the alkaline earth metal compounds and liquefaction bottoms are surprising.

The results of additional tests of various alkaline earth metal compounds carried out with liquefaction bottoms from two different pilot plant liquefaction units and with various alkaline earth metal compound concentrations are set forth in Table III below and in FIGS. 2, 3 and 4 in the drawing. These tests were all carried out insubstantially the same manner as those described above.

TABLE III

Steam Gasification of Liquefaction Bottoms Char

| Catalyst | Liquefaction Bottoms Source | Metal-to-Carbon Atom Ratio $\times 10^2$ | Gasification Rate* - %/Hr. |
|---|---|---|---|
| None | Liq. Unit 1 | — | 10 |
| $K_2CO_3$ | Liq. Unit 1 | 1.8 | 34 |
| $MgCO_3$ | Liq. Unit 1 | 2.6 | 35 |
| Mg Acetate | Liq. Unit 1 | 1.4 | 16 |
| $Mg(OH)_2$ | Liq. Unit 2 | 2.0 | 10 |
| $Ca(OH)_2$ | Liq. Unit 2 | 1.9 | 138 |
| Ca Stearate | Liq. Unit 1 | 1.7 | 125 |
| Ca Acetate | Liq. Unit 1 | 1.5 | 114 |
| $Ca(OH)_2$ | Liq. Unit 1 | 1.5 | 101 |
| Ca Naphthenate | Liq. Unit 1 | 1.8 | 73 |
| $CaCl_2$ | Liq. Unit 1 | 1.5 | 46 |
| $CaCO_3$ | Liq. Unit 1 | 2.4 | 43 |
| $Ca(OH)_2$** | Liq. Unit 2 | 1.4 | 6 |
| $Sr(OH)_2$ | Liq. Unit 2 | 1.8 | 58 |
| $Sr(OH)_2$ | Liq. Unit 1 | 1.8 | 49 |
| Ba Acetate | Liq. Unit 1 | 2.3 | 144 |
| $Ba(OH)_2$ | Liq. Unit 1 | 1.6 | 115 |
| $Ba(OH)_2$ | Liq. Unit 2 | 1.8 | 113 |
| Ba Acetate | Liq. Unit 1 | 1.5 | 95 |

Steam Gasification of Petroleum Fluid Coke

| Catalyst | Catalyst-to-Carbon Atom Ratio $\times 10^2$ | Gasification Rate* - %/Hr. |
|---|---|---|
| None | — | 12 |
| $K_2CO_3$ | 1.5 | 110 |
| $Ca(OH)_2$ | 1.5 | 8 |

TABLE III-continued

| Ca Acetate | 1.4 | 8 |
|---|---|---|

*Based on 30 minute gasification.
**Bottoms coked before catalyst applied.

The data in Table III illustrate that a wide variety of different compounds of calcium, barium and strontium are surprisingly effective for accelerating the gasification of carbonaceous solids produced by the pyrolysis of coal liquefaction bottoms if added to the bottoms prior to the pyrolysis step. These data also show that such compounds are ineffective if added to the solids following the pyrolysis step. For comparison purposes, data are included on the use of magnesium compounds and on the use of potassium carbonate, calcium hydroxide and calcium acetate with petroleum fluid coke. The data show that the magnesium compounds are relatively ineffective. It can be seen that potassium carbonate is a highly effective gasification catalyst for petroleum coke, but that the calcium compounds had essentially no catalytic effect. This marked difference between the behavior of alkali metal compounds and that of alkaline earth metal compounds again emphasizes that the results obtained in accordance with the invention are unexpected and surprising.

Figure 2:
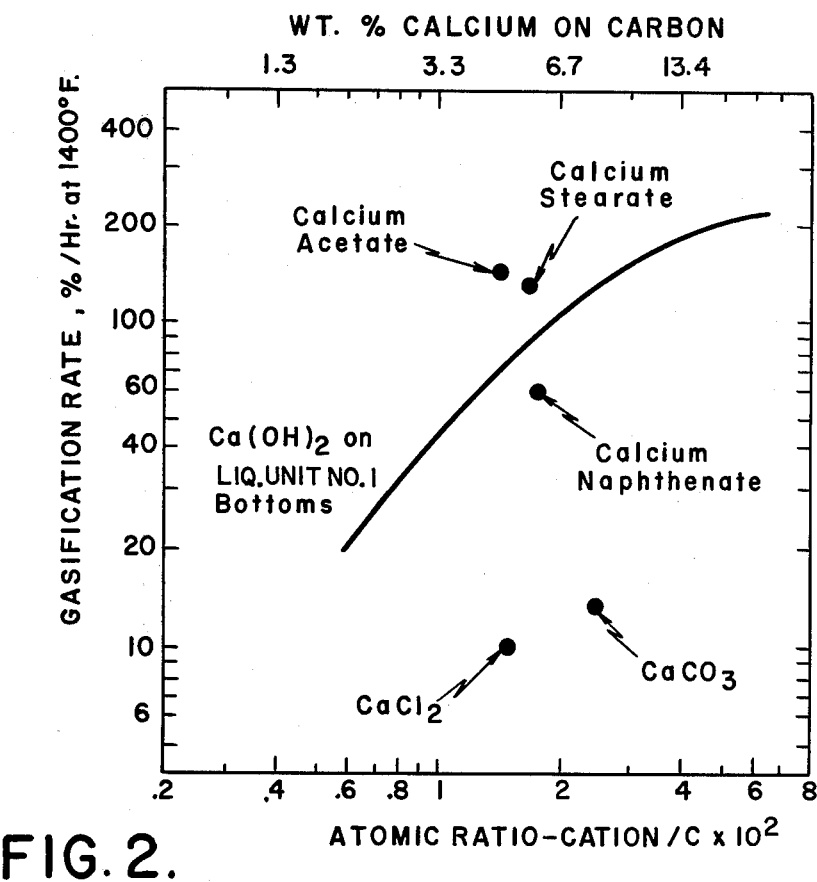
FIG. 2 is a plot illustrating the improvement in the gasification rate obtained by using various catalysts to gasify heavy bottoms produced in coal liquefaction operations.
Figure 3:
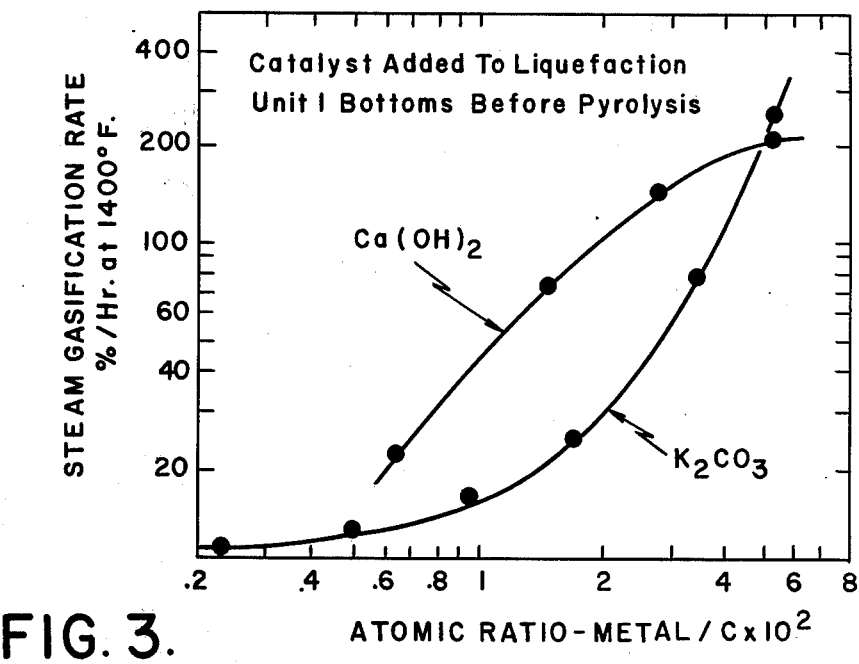
FIG. 3 is a plot comparing the effectiveness of potassium carbonate and calcium hydroxide for purposes of the invention.
Figure 4:
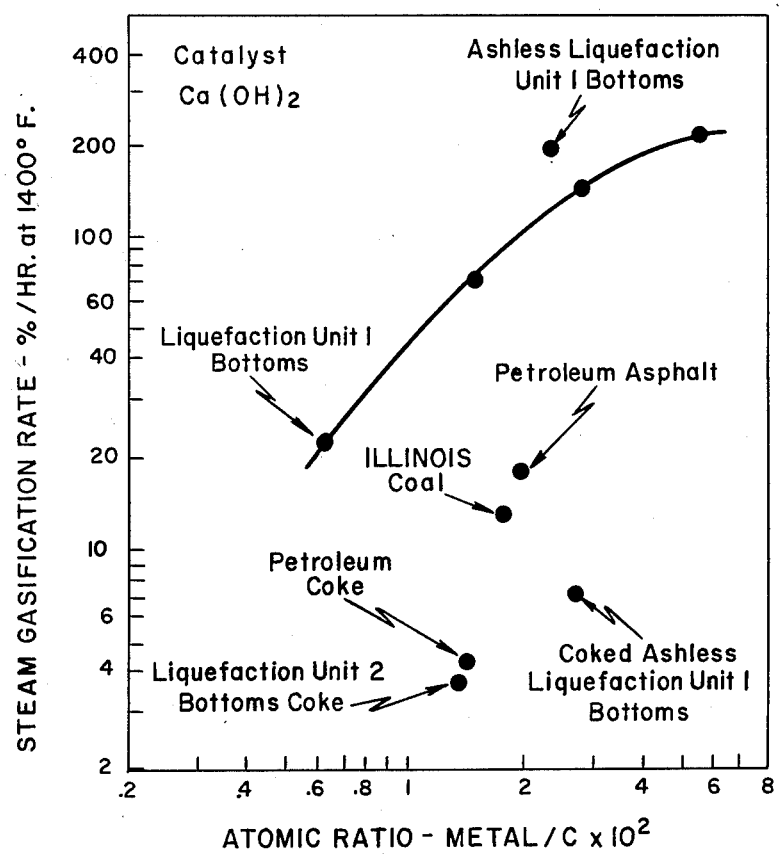
FIG. 4 is a plot showing the effect of calcium hydroxide on the gasification rate of various carbonaceous materials.

The data set forth in FIGS. 2, 3 and 4 of the drawing further illustrate the invention. The gasification rates in FIGS. 2, 3 and 4 are based on 30–50% carbon gasified. The effect of alkaline earth metal concentration on the gasification rate is shown in FIG. 2 by the results with calcium hydroxide and liquefaction bottoms, as are the results obtained with other calcium compounds. FIG. 3 sets forth a comparison of the results obtained with potassium carbonate and calcium hydroxide, from which it can be seen that the calcium hydroxide is surprisingly more effective than the potassium carbonate until very high metal concentrations are reached. Since the molar cost of potassium as the carbonate is about eight times that of calcium as the hydroxide, these results demonstrate the economic advantages of the invention. FIG. 4 includes additional data on the use of calcium hydroxide and again demonstrates the ineffectiveness of this material for the gasification of solids such as coal, petroleum asphalt, petroleum coke, and coke produced by the pyrolysis of liquefaction bottoms.

In view of the foregoing, it should be apparent that the invention provides an improved process for the gasification of coke or char produced by the pyrolysis of coal liquefaction bottoms which has pronounced advantages over processes available in the past. The use of alkaline earth metal catalyst to accelerate the gasification rate makes possible significant reductions in the cost of such operations and thus makes coal liquefaction more attractive as a source of chemical feedstocks and liquid and gaseous fuels than it has been in the past.

I claim:

1. A process for upgrading heavy bottoms produced by the liquefaction of coal or similar carbonaceous solids which comprises pyrolyzing said bottoms in the presence of an added alkaline earth metal compound to produce coke containing added alkaline earth metal constituents and thereafter gasifying said coke in the presence of steam.

2. A process as defined by claim 1 wherein said alkaline earth metal compound comprises a calcium compound.

3. A process as defined by claim 1 wherein said liquefaction bottoms is a 1000° F.+ bottoms product produced by the hydrogen donor solvent liquefaction of coal.

4. A process as defined by claim 1 wherein said coke is pyrolyzed in a fluidized bed coking unit at a temperature between about 900° F. and about 1600° F.

5. A process as defined by claim 1 wherein said alkaline earth metal compound is added to said heavy bottoms in a concentration sufficient to provide, following said pyrolysis of said bottoms, an alkaline earth metal-to-carbon atomic ratio of about 0.005:1 to about 0.1:1.

6. A process as defined by claim 1 wherein said alkaline earth metal compound comprises calcium hydroxide.

7. A process as defined by claim 1 wherein said alkaline earth metal compound comprises a barium compound.

8. A process as defined by claim 1 wherein said alkaline earth metal compound comprises a strontium compound.

9. A process as defined by claim 1 wherein said alkaline earth metal compound is added to said bottoms in a concentration between about 1% and about 30% by weight.

10. A process as defined by claim 1 wherein said alkaline earth metal compound is an alkaline earth metal soap.

11. An improved coal liquefaction process which comprises contacting feed coal with gaseous hydrogen and a hydrogen-donor solvent under coal liquefaction conditions in a coal liquefaction zone; withdrawing a liquefaction product including constituents boiling in excess of about 1000° F. from said liquefaction zone; recovering a heavy liquefaction bottoms fraction containing said constituents boiling above about 1000° F. from said liquefaction product; adding an alkaline earth metal compound to said bottoms fraction in a concentration sufficient to provide, following the pyrolysis of said bottoms fraction, an alkaline earth metal-to-carbon atomic ratio between about 0.005:1 and about 0.1:1, pyrolyzing said bottoms fraction and recovering coke; and thereafter gasifying said coke in the presence of steam.

12. A process as defined by claim 11 wherein said alkaline earth metal compound is a calcium salt.

13. A process as defined by claim 11 wherein said alkaline earth metal compound is added to said bottoms fraction in a concentration sufficient to provide, following the pyrolysis of said bottoms fraction, an alkaline earth metal-to-carbon atomic ratio of from about 0.01:1 to about 0.06:1.

14. A process as defined by claim 11 wherein said alkaline earth metal compound is a calcium soap.

15. A process as defined by claim 11 wherein said alkaline earth metal compound comprises calcium hydroxide.

16. A process as defined by claim 11 wherein said bottoms fraction is pyrolyzed in a fluid coking unit at a temperature between about 900° F. and about 1600° F.

17. A process as defined by claim 11 wherein said alkaline earth metal compound is a barium compound.

18. A process as defined by claim 11 wherein said alkaline earth metal compound is a strontium compound.

19. A process as defined by claim 11 wherein said alkaline earth metal compound is added to said bottoms fraction in an organic solvent.

* * * * *